(12) United States Patent
Newton

(10) Patent No.: US 10,906,158 B2
(45) Date of Patent: Feb. 2, 2021

(54) SYSTEM, FIXTURE PLATE ASSEMBLY, AND METHOD FOR INDEXING A WORKPIECE

(71) Applicant: The Boeing Company, Chicago, IL (US)

(72) Inventor: Andrew P. Newton, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 214 days.

(21) Appl. No.: 16/238,327

(22) Filed: Jan. 2, 2019

(65) Prior Publication Data

US 2020/0206880 A1 Jul. 2, 2020

(51) Int. Cl.
  *B25B 11/00* (2006.01)
  *B23Q 3/18* (2006.01)
  *B23Q 3/08* (2006.01)

(52) U.S. Cl.
  CPC ............ *B25B 11/005* (2013.01); *B23Q 3/088* (2013.01); *B23Q 3/186* (2013.01)

(58) Field of Classification Search
  CPC .......... B23Q 3/18; B23Q 3/186; B23Q 3/002; B23Q 3/005; B23Q 3/088; B23Q 3/107; B23Q 3/008; B25B 11/00; B25B 11/005; H01L 21/68; H01L 21/682; H01L 21/6838
  See application file for complete search history.

(56) References Cited

U.S. PATENT DOCUMENTS

| | | | | | |
|---|---|---|---|---|---|
| 2,782,574 | A | * | 2/1957 | Copold | B25B 11/005 451/388 |
| 4,747,589 | A | * | 5/1988 | Watson | B23Q 1/38 269/21 |
| 4,880,218 | A | * | 11/1989 | Greene | B23Q 1/035 269/21 |
| 4,946,149 | A | * | 8/1990 | Greene | B23Q 16/001 269/21 |
| 5,177,857 | A | * | 1/1993 | Ito | B25B 11/005 269/21 |
| 6,328,507 | B1 | * | 12/2001 | Shoda | B23Q 1/032 269/21 |

* cited by examiner

*Primary Examiner* — Tyrone V Hall, Jr.
(74) *Attorney, Agent, or Firm* — Kunzler Bean & Adamson

(57) ABSTRACT

Disclosed herein is a system for indexing a workpiece. The system comprises a vacuum source and a fixture plate, fluidly coupled with the vacuum source. The system also comprises an indexing stop, coupled to the fixture plate and fluidly coupled with the vacuum source. The indexing stop is actuatable between an extended position and a retracted position relative to the fixture plate. The vacuum source is selectively operable to concurrently apply a suction force to a workpiece supported on the fixture plate to urge the workpiece against the fixture plate and to the indexing stop to actuate the indexing stop from the extended position to the retracted position.

20 Claims, 6 Drawing Sheets

SYSTEM, FIXTURE PLATE ASSEMBLY, AND METHOD FOR INDEXING A WORKPIECE

FIELD

This disclosure relates generally to fabrication of workpieces into parts, and more particularly to spatially indexing workpieces on a fixture prior to fabrication of the workpieces into parts.

BACKGROUND

For some fabrication processes, such as milling and drilling, spatially indexing and securing a workpiece on a fixture, prior to initiating the fabrication processes, are necessary. Conventionally, indexing is performed by locating the workpiece against one or more indexing features at fixed locations on the fixture. Such indexing features can make the fabrication of some workpieces, particularly thin workpieces, by obstructing the tooling used to perform the fabrication processes.

SUMMARY

The subject matter of the present application has been developed in response to the present state of the art, and in particular, in response to the shortcomings of current workpiece indexing and retention systems and methods, that have not yet been fully solved by currently available techniques. Accordingly, the subject matter of the present application has been developed to provide a system, a fixture plate assembly, and a method that overcome at least some of the above-discussed shortcomings of prior art techniques.

Disclosed herein is a system for indexing a workpiece. The system comprises a vacuum source and a fixture plate, fluidly coupled with the vacuum source. The system also comprises an indexing stop, coupled to the fixture plate and fluidly coupled with the vacuum source. The indexing stop is actuatable between an extended position and a retracted position relative to the fixture plate. The vacuum source is selectively operable to concurrently apply a suction force to a workpiece supported on the fixture plate to urge the workpiece against the fixture plate and to the indexing stop to actuate the indexing stop from the extended position to the retracted position. The preceding subject matter of this paragraph characterizes example 1 of the present disclosure.

The fixture plate comprises a bore and the indexing stop is translationally movable within the bore between the extended position and the retracted position. The suction force is applied to the indexing stop via the bore. The preceding subject matter of this paragraph characterizes example 2 of the present disclosure, wherein example 2 also includes the subject matter according to example 1, above.

The system further comprises an indexing assembly, positioned at least partially within the bore of the fixture plate. The indexing assembly comprises the indexing stop, a housing that defines an interior cavity within which the indexing stop is translationally movable, and a spring. The spring is within the interior cavity and biases the indexing stop into the extended position. The preceding subject matter of this paragraph characterizes example 3 of the present disclosure, wherein example 3 also includes the subject matter according to example 2, above.

The housing comprises a through-port having a first end fluidly open to the interior cavity and a second end, opposite the first end, fluidly open to the vacuum source. The preceding subject matter of this paragraph characterizes example 4 of the present disclosure, wherein example 4 also includes the subject matter according to example 3, above.

The indexing assembly further comprises a seal interposed between the indexing stop and the housing. The seal forms a fluidic seal between the indexing stop and the housing as the indexing stop translationally moves within the interior cavity of the housing. The preceding subject matter of this paragraph characterizes example 5 of the present disclosure, wherein example 5 also includes the subject matter according to example 4, above.

The fixture plate comprises a fluid conduit and the suction force is applied to the workpiece via the fluid conduit. The bore and the fluid conduit are fluidly coupled together and to the vacuum source. The preceding subject matter of this paragraph characterizes example 6 of the present disclosure, wherein example 6 also includes the subject matter according to any one of examples 2-5, above.

The fixture plate comprises a support surface. The workpiece is urged against the support surface when the vacuum source concurrently applies the suction force to the workpiece. In the extended position, the indexing stop protrudes from the support surface. In the retracted position, the indexing stop does not protrude from the support surface. The preceding subject matter of this paragraph characterizes example 7 of the present disclosure, wherein example 7 also includes the subject matter according to any one of examples 1-6, above.

In the retracted position, the indexing stop is flush with the support surface. The preceding subject matter of this paragraph characterizes example 8 of the present disclosure, wherein example 8 also includes the subject matter according to example 7, above.

In the retracted position, the indexing stop is recessed relative to the support surface. The preceding subject matter of this paragraph characterizes example 9 of the present disclosure, wherein example 9 also includes the subject matter according to example 7, above.

The system further comprises a base fluidly coupled with the vacuum source and supporting the fixture plate. The vacuum source is further selectively operable to concurrently apply the suction force to the fixture plate to urge the fixture plate against the base. The preceding subject matter of this paragraph characterizes example 10 of the present disclosure, wherein example 10 also includes the subject matter according to any one of examples 1-9, above.

The fixture plate comprises a fluid conduit integratably formed in the fixture plate. The base comprises a second fluid conduit, a third fluid conduit, and a fourth fluid conduit integratably formed in the base. The fluid conduit of the fixture plate is fluidly coupled with the third fluid conduit of the base and the suction force is concurrently applied to the workpiece via the fluid conduit of the fixture plate and the third fluid conduit of the base. The suction force is concurrently applied to the fixture plate via the second fluid conduit. The suction force is concurrently applied to the indexing stop via the fourth fluid conduit of the base. The system further comprises a source fluid conduit fluidly interconnecting the second fluid conduit, the third fluid conduit, and the fourth fluid conduit of the base with the vacuum source. The preceding subject matter of this paragraph characterizes example 11 of the present disclosure, wherein example 11 also includes the subject matter according to example 10, above.

The system further comprises a plurality of indexing stops spaced apart from each other about the fixture plate according to a predetermined workpiece indexing pattern. The vacuum source is selectively operable to concurrently apply the suction force to the plurality of indexing stops to concurrently actuate the plurality of indexing stops from the extended position to the retracted position. The preceding subject matter of this paragraph characterizes example 12 of the present disclosure, wherein example 12 also includes the subject matter according to any one of examples 1-11, above.

Also disclosed herein is a fixture plate assembly for indexing a workpiece. The fixture plate assembly comprises a fixture plate, fluidly coupleable with a vacuum source, and an indexing stop, coupled to the fixture plate and fluidly coupleable with the vacuum source. The indexing stop is actuatable between an extended position and a retracted position relative to the fixture plate. When fluidly coupled with the vacuum source, selective operation of the vacuum source concurrently applies a suction force to a workpiece supported on the fixture plate to urge the workpiece against the fixture plate and to the indexing stop to actuate the indexing stop from the extended position to the retracted position. The preceding subject matter of this paragraph characterizes example 13 of the present disclosure.

The fixture plate comprises a bore. The fixture plate assembly further comprises an indexing assembly, positioned at least partially within the bore of the fixture plate. The indexing assembly comprises the indexing stop. The indexing assembly further comprises a housing, non-movably fixed relative to the fixture plate and defining an interior cavity within which the indexing stop is translationally movable between the extended position and the retracted position. The indexing assembly also comprises a spring, within the interior cavity and biasing the indexing stop into the extended position. The suction force is applied to the indexing stop via the interior cavity of the housing and the bore of the fixture plate. The preceding subject matter of this paragraph characterizes example 14 of the present disclosure, wherein 14 also includes the subject matter according to example 13, above.

The fixture plate comprises a support surface. The workpiece, when supported on the support surface, is urged against the support surface when the vacuum source concurrently applies the suction force to the workpiece. In the extended position, the indexing stop protrudes from the support surface. In the retracted position, the indexing stop is flush with or recessed relative to the support surface. The preceding subject matter of this paragraph characterizes example 15 of the present disclosure, wherein example 15 also includes the subject matter according to any one of examples 13 or 14, above.

The fixture plate assembly further comprises a plurality of indexing stops spaced apart from each other about the fixture plate according to a predetermined workpiece indexing pattern. When fluidly coupled with the vacuum source, selective operation of the vacuum source concurrently applies the suction force to the plurality of indexing stops to concurrently actuate the plurality of indexing stops from the extended position to the retracted position. The preceding subject matter of this paragraph characterizes example 16 of the present disclosure, wherein example 16 also includes the subject matter according to any one of examples 13-15, above.

Also disclosed herein is a method of indexing a workpiece. The method comprises locating a workpiece on a fixture plate and against an indexing stop coupled to the fixture plate and in an extended position relative to the fixture plate. The method also comprises, with the workpiece on the fixture plate against the indexing stop, concurrently applying a suction force to the workpiece, to urge the workpiece against the fixture plate, and to the indexing stop, to actuate the indexing stop from the extended position to a retracted position relative to the fixture plate. The preceding subject matter of this paragraph characterizes example 17 of the present disclosure.

In the retracted position, the indexing stop is flush with or recessed relative to a support surface of the fixture plate on which the workpiece is supported when the workpiece is located on the fixture plate. The preceding subject matter of this paragraph characterizes example 18 of the present disclosure, wherein example 18 also includes the subject matter according to example 17, above.

The method further comprises locating the fixture plate on a base. Concurrently applying the suction force to the workpiece and to the indexing stop further comprises concurrently applying the suction force to the fixture plate to urge the fixture plate against the base. The preceding subject matter of this paragraph characterizes example 19 of the present disclosure, wherein example 19 also includes the subject matter according to any one of examples 17-18, above.

The suction force is applied via selective operation of a vacuum source. The preceding subject matter of this paragraph characterizes example 20 of the present disclosure, wherein example 20 also includes the subject matter according to any one of examples 17-19, above.

The described features, structures, advantages, and/or characteristics of the subject matter of the present disclosure may be combined in any suitable manner in one or more examples, embodiments, and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
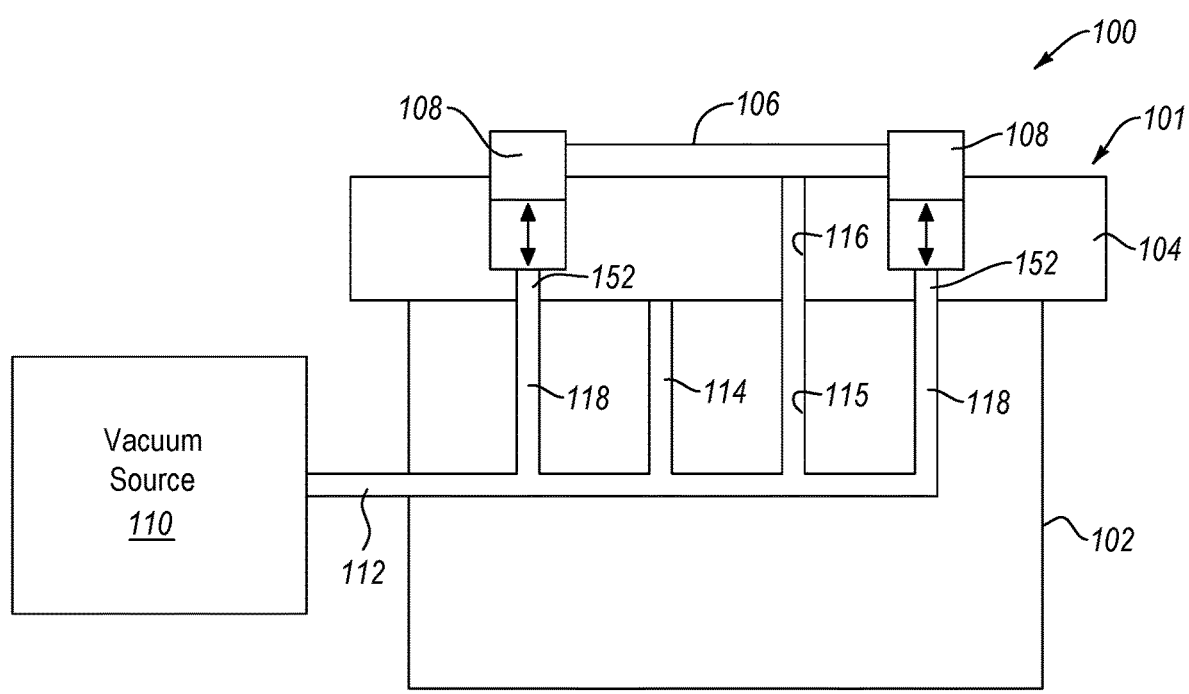
FIG. 1 is a schematic block diagram of a system for indexing a workpiece, with an indexing stop in an extended position according to one or more examples of the present disclosure.
Figure 2:
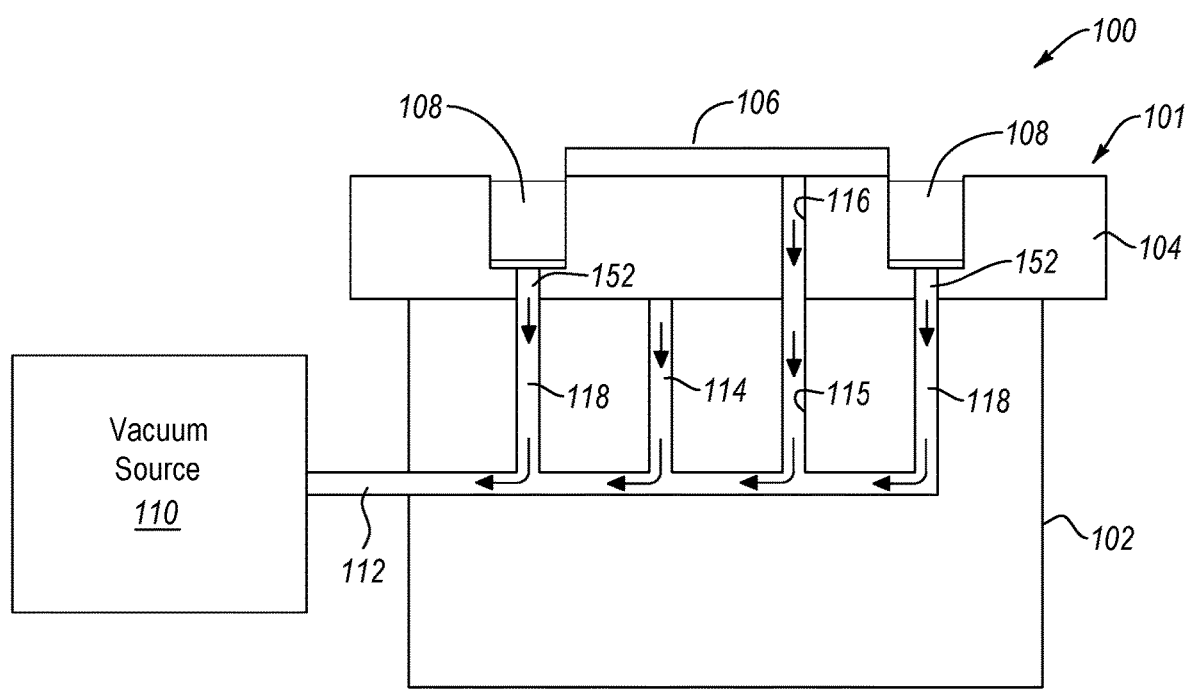
FIG. 2 is a schematic block diagram of the system for indexing a workpiece of FIG. 1, with the indexing stop in a retracted position according to one or more examples of the present disclosure.

Referring to FIGS. 1 and 2, according to some examples, a system 100 for indexing a workpiece 106 is disclosed. As used herein, "indexing" means spatially indexing. The system 100 includes a vacuum source 110, a fixture plate 104, and an indexing stop 108. The fixture plate 104 and the indexing stop 108 collecting form a fixture plate assembly 101. The fixture plate 104 is fluidly coupled with the vacuum source 110 via one or more fluid conduits. The indexing stop 108 is coupled to the fixture plate 104 and is fluidly coupled with the vacuum source 110 via one or more fluid conduits. The indexing stop 108 is actuatable between an extended position (e.g., as shown FIG. 1) and a retracted position (e.g., as shown in FIG. 2) relative to the fixture plate 104. The vacuum source 110 is selectively operable to concurrently apply a suction force to a workpiece 106, supported on the fixture plate 104, to urge the workpiece 106 against the fixture plate 104 and to the indexing stop 108 to actuate the indexing stop 108 from the extended position to the retracted position.

Forming a part from a workpiece 106 often requires the workpiece 106 to be indexed (e.g., positioned and oriented) on a fixture plate 104, which locates the workpiece 106 in a proper position and orientation for being fabricated. Indexing stops, or edge stops, such as indexing stop 108, protrude from the fixture plate 104 at locations corresponding with a predetermined workpiece indexing pattern. The workpiece 106 can be quickly spatially indexed on the fixture plate 104, in preparation for being formed by formation tools (e.g., cutting tools, grinding tools, drilling tools, and the like), by bringing the workpiece 106 into contact with the indexing stops. After being properly indexed with the aid of the indexing stops, the suction force applied to the workpiece 106 helps to retain the workpiece 106 on the fixture plate 104 while the workpiece 106 is fabricated. When fabricating some parts (such as shims, for example), a thickness of the workpiece 106 may need to be reduced down to a relatively thin dimension that is less than the indexing stops. In such situations, the indexing stops would introduce an obstacle to forming the workpiece to a desired thickness. Accordingly, the suction force applied to the workpiece 106 actuates the indexing stop 108 into the retracted position, which in effect moves the indexing stop 108 out of the way so as not to obstruct the fabrication of the workpiece 106. Because the suction force is applied concurrently to the workpiece 106 and the indexing stop 108, retention of the workpiece 106 on the fixture plate 104 and clearing the workpiece 106 of the indexing stop 108 are done at the same time and in the same manner, which helps to simplify and improve the efficiency of the process and tooling associated with forming the workpiece 106. In other words, the suction force generated by the vacuum source 110 and used to hold the workpiece 106 on the fixture plate 104 can be shared to also retract the indexing stop 108 after indexing of the workpiece 106 is completed and the indexing stop 108 is no longer needed.

The vacuum source 110, which is a vacuum pump or similar device in some examples, is fluidly coupled with the fixture plate 104 and the indexing stop 108 via one or more fluid conduits. In the illustrated example of FIGS. 1 and 2, the fixture plate 104 is fluidly coupled with the vacuum source 110 by a source fluid conduit 112 and a fluid conduit 116. The source fluid conduit 112 is directly fluidly coupled to the vacuum source 110 and the fluid conduit 116 is indirectly fluidly coupled with the vacuum source 110 via the source fluid conduit 112. Accordingly, the source fluid conduit 112 is between the fluid conduit 116 and the vacuum source 110. In the illustrated example of FIGS. 1 and 2, the indexing stop 108 is fluidly coupled with the vacuum source 110 by a source fluid conduit 112 and a fourth fluid conduit 118, which is indirectly fluidly coupled with the vacuum source 110 via the source fluid conduit 112. Accordingly, the source fluid conduit 112 is between the fourth fluid conduit 118 and the vacuum source 110. As used herein, components that are fluidly coupled means a contained and controlled stream of fluid or gas is allowed to flow between the components. The fluid conduit 116 is open to the workpiece 106 or closed by the workpiece 106 when the workpiece 106 is supported on the fixture plate 104. The fourth fluid conduit 118 is open to the indexing stop 108.

Referring to FIG. 1, with the vacuum source 110 turned off, the pressure within the source fluid conduit 112, the fluid conduit 116, and the fourth fluid conduit 118 is equal to the pressure external to the source fluid conduit 112, the fluid conduit 116, and the fourth fluid conduit 118. However, referring to FIG. 2, when the vacuum source 110 is turned on and selectively operated to reduce the pressure within the source fluid conduit 112, the fluid conduit 116, and the fourth fluid conduit 118 relative to outside the conduits (i.e., create a vacuum or near vacuum environment within the source fluid conduit 112, the fluid conduit 116, and the fourth fluid conduit 118), which is indicated by the directional arrows, a pressure differential is created. The pressure differential causes a suction force to be applied to the workpiece 106 via the fluid conduit 116 and concurrently causes a suction force to be applied to the indexing stop 108 via the fourth fluid conduit 118. The corresponding suction forces urge the workpiece 106 against the fixture plate 104 and urge the indexing stop 108 to actuate from the extended position, in contact with the workpiece 106, to the retracted position, out of contact or less in contact with the workpiece 106. In some examples, the fixture plate 104 includes at least one fluid pocket 152 (which can be similar or the same as a fluid conduit) that helps to fluidly couple the corresponding fourth fluid conduit 118 with the corresponding indexing stop 108.

According to some examples, the system 100 additionally includes a base 102 that is fluidly coupled with the vacuum source 110. The base 102 supports the fixture plate 104. The vacuum source 110 is fluidly coupled with the base 102 via one or more fluid conduits. In the illustrated example of FIGS. 1 and 2, the base 102 is fluidly coupled with the vacuum source 110 by the source fluid conduit 112. At least a portion of the source fluid conduit 112 forms part of the base 102. The base 102 further includes a second fluid conduit 114 and a third fluid conduit 115 that are fluidly coupled to the source fluid conduit 112. The second fluid conduit 114 is open to the fixture plate 104 or closed by the fixture plate 104 when the fixture plate 104 is supported on the base 102. The third fluid conduit 115 is open to the fluid conduit 116 of the fixture plate 104.

Referring to FIG. 1, with the vacuum source 110 turned off, the pressure within the source fluid conduit 112, the second fluid conduit 114, and the third fluid conduit 115 is equal to the pressure external to the source fluid conduit 112, the second fluid conduit 114, and the third fluid conduit 115. However, referring to FIG. 2, when the vacuum source 110 is turned on and selectively operated to reduce the pressure within the source fluid conduit 112, the second fluid conduit 114, and the third fluid conduit 115 relative to outside the conduits (i.e., create a vacuum or near vacuum environment within the source fluid conduit 112, the second fluid conduit 114, and the third fluid conduit 115), which is indicated by the directional arrows, a pressure differential is created. The pressure differential causes a suction force to be applied to the workpiece 106 via the third fluid conduit 115 and concurrently causes a suction force to be applied to the fixture plate 104 via the second fluid conduit 114. The suction force urges the fixture plate 104 against the base 102.

Figure 3:
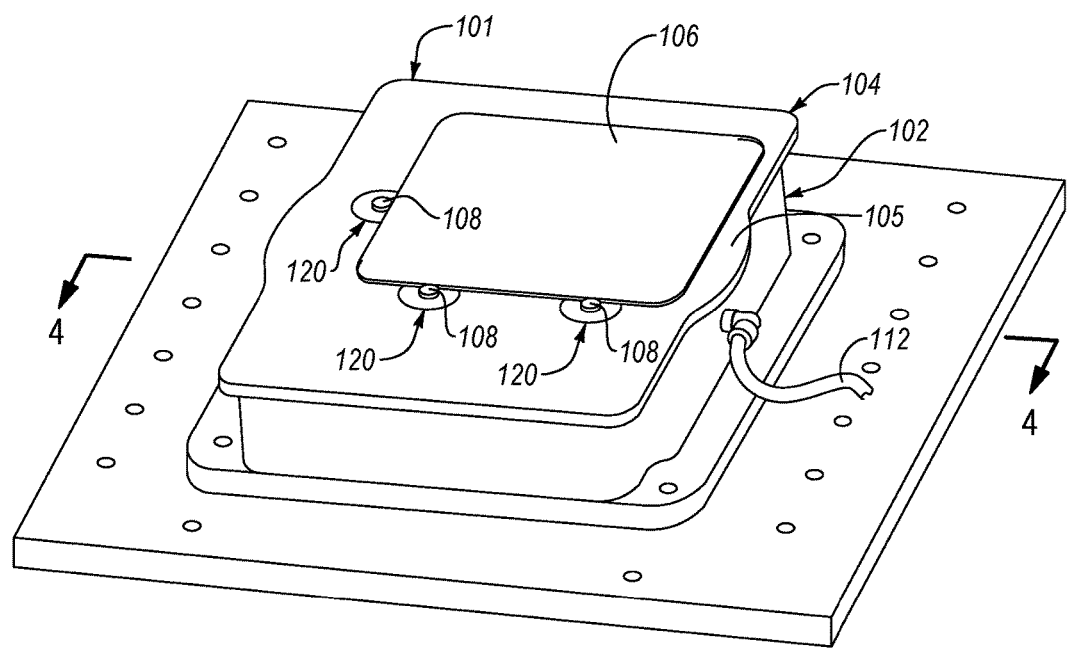
FIG. 3 is a perspective view of a system for indexing a workpiece, according to one or more examples of the present disclosure.
Figure 4:
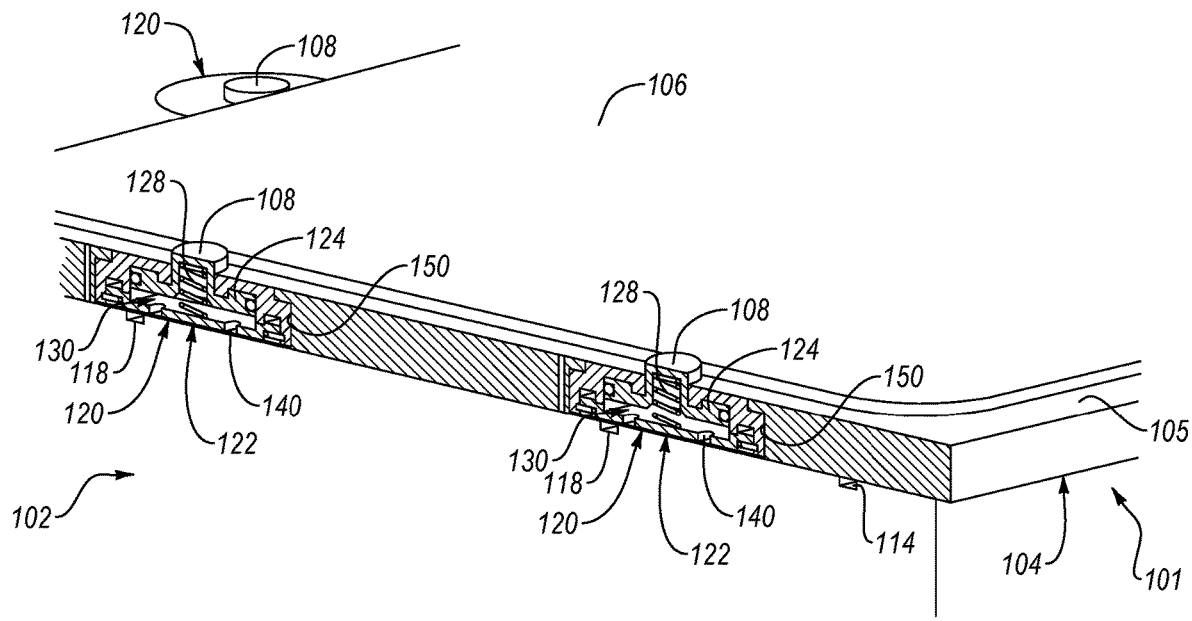
FIG. 4 is a cross-sectional perspective view of the system of FIG. 3, taken along the line 4-4 of FIG. 3, according to one or more examples of the present disclosure.

In some examples, the system 100 includes a plurality of indexing stops 108. Two indexing stops 108 are shown in FIGS. 1 and 2, which can accommodate a workpiece 106 with a circular shape. In FIGS. 3 and 4, three indexing stops 108 are shown to accommodate a workpiece 106 that is rectangular-shaped. According to other examples, the system 100 can include more than three indexing stops 108 to accommodate a workpiece 106 with a more complex shape. The number of indexing stops 108 depends on the number of indexing stops 108 needed to properly index the workpiece 106, which is dependent on the size and shape of the workpiece 106. The indexing stops 108 are spaced apart from each other about the fixture plate 104 according to a predetermined workpiece indexing pattern, which is based on the size and shape of the workpiece 106. In examples with multiple indexing stops 108, the vacuum source 110 is selectively operable to concurrently apply the suction force to the plurality of indexing stops 108 to concurrently actuate the plurality of indexing stops 108 from the extended position to the retracted position.

Figure 5:
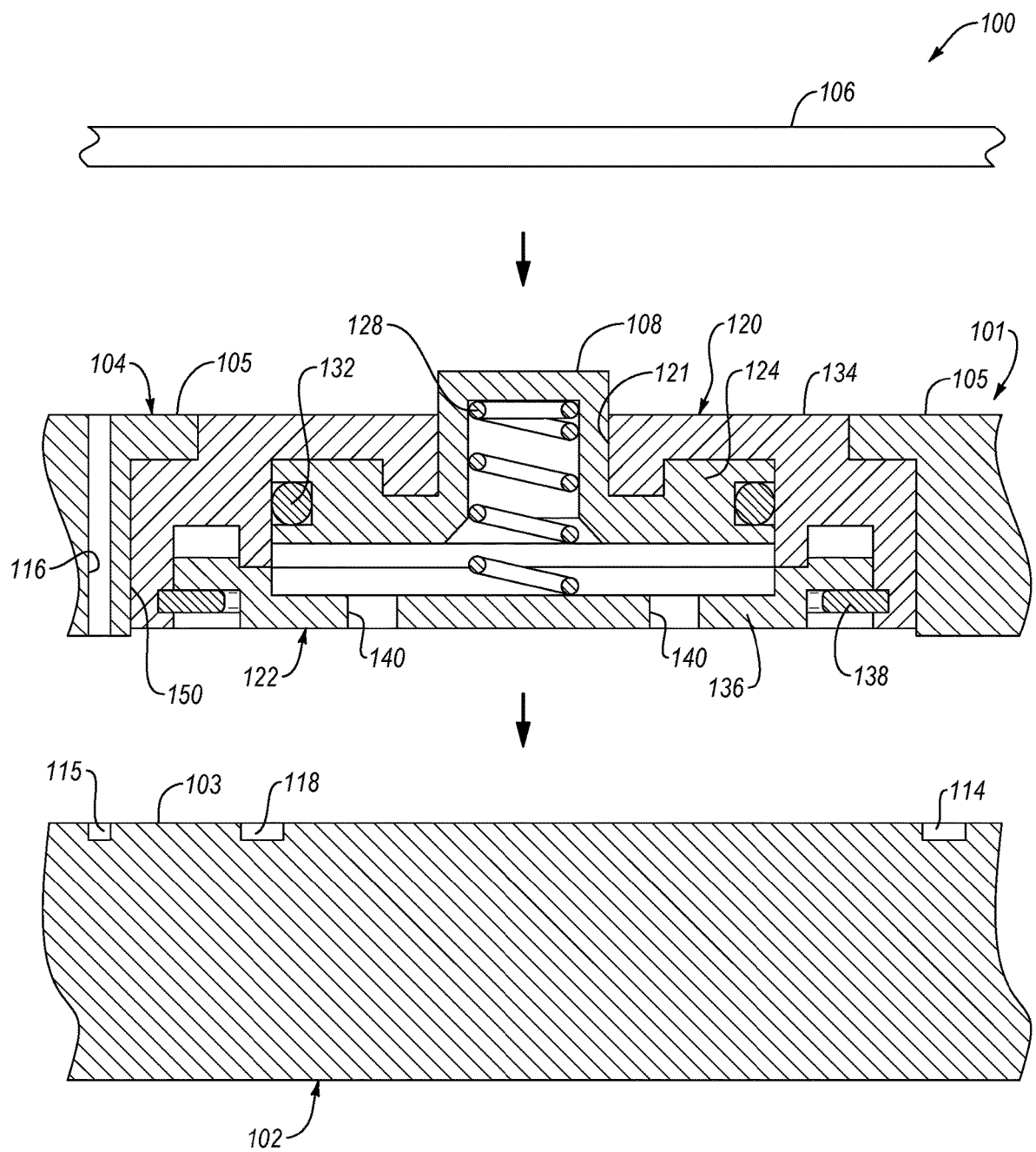
FIG. 5 is an exploded cross-sectional side elevation view of a system for indexing a workpiece, according to one or more examples of the present disclosure.
Figure 6:
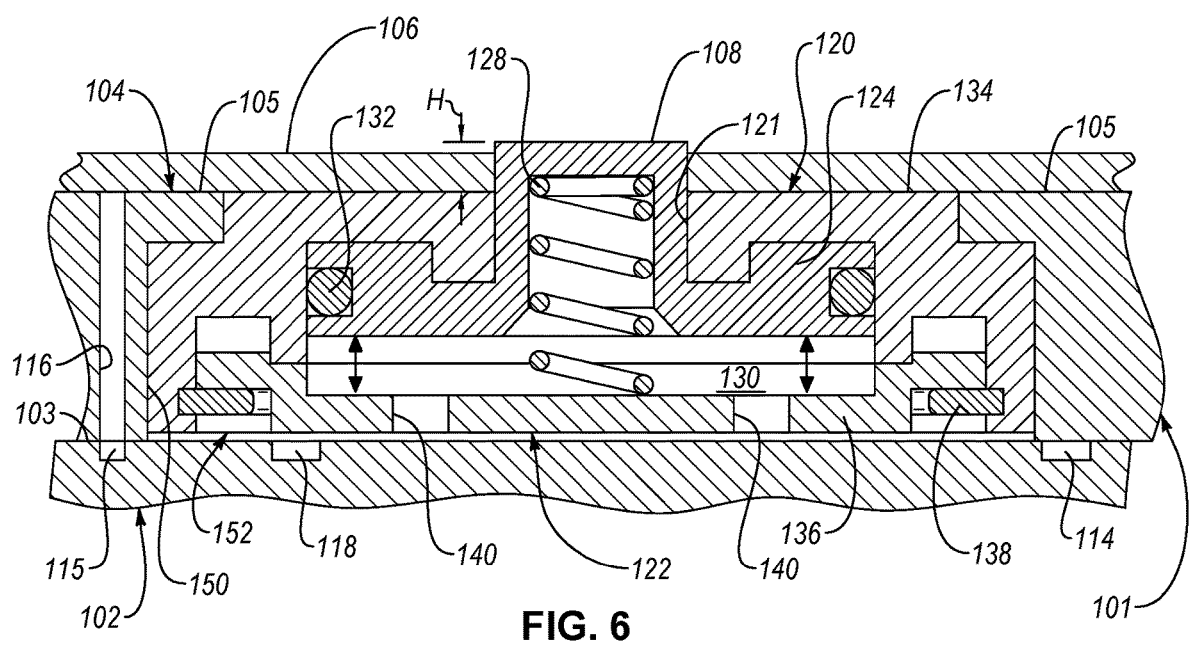
FIG. 6 is a cross-sectional side elevation view of the system of FIG. 5, with an indexing stop in an extended position, according to one or more examples of the present disclosure.
Figure 7:
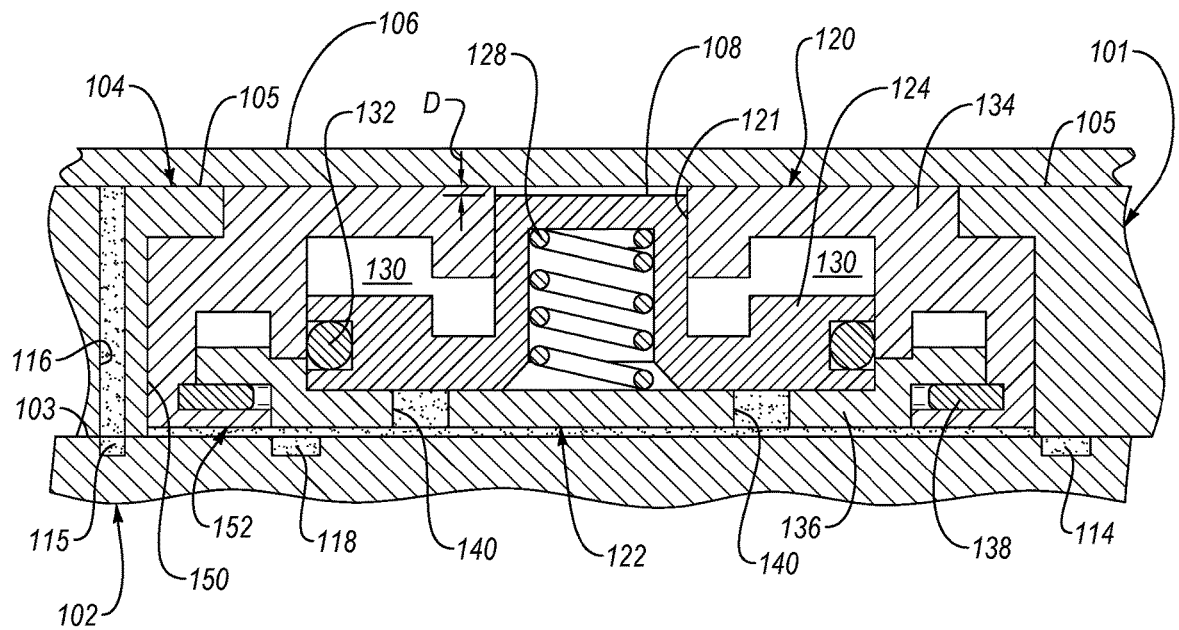
FIG. 7 is a cross-sectional side elevation view of the system of FIG. 5, with the indexing stop in a retracted position, according to one or more examples of the present disclosure.

Referring to some examples, as shown in FIGS. 3-7, the indexing assembly 120 is fixed to the fixture plate 104 within a bore 150 of the fixture plate 104. The bore 150 is a through-bore in certain examples. Moreover, in some examples, as shown, the bore 150 is a counterbore. When fixed within the bore 150, the indexing stop 108 is translationally movable within the bore 150 between the extended position and the retracted position. Referring to FIGS. 6 and 7, a portion of the bore 150 defines the fluid pocket 152, which is the portion of the bore 150 interposed between the indexing assembly 120 and the base 102. The bore 150 provides a receptacle into which the indexing assembly 120 can be inserted and retained. Moreover, the bore 150 allows the indexing assembly 120 to be fluidly influenced on one side of the fixture plate 104 to allow the indexing stop 108 to extend away from and retract into the opposite side of the fixture plate 104.

The indexing assembly 120 includes a housing 122 that defines an interior cavity 130. An upper side of the housing 122 includes an aperture 121 through which the indexing stop 108 is allowed to pass through and move along as it translationally moves within the interior cavity 130 of the housing 122. The indexing assembly 120 also includes a spring 128 within the interior cavity 130. The spring 128 is in engagement with the indexing stop 108 to bias the indexing stop 108 into the extended position (see FIG. 6). Accordingly, the spring 128 can be any of various biasing elements configured to bias the indexing stop 108 into the extended position. The indexing stop 108 has any of various configurations for engaging and stopping an edge of the workpiece 106. In some examples, the indexing stop 108 is a cylindrical pin with a circular cross-sectional shape. The indexing stop 108 can be at least partially hollow so as to define a portion within which the spring 128 can be seated.

The indexing stop 108 forms part of an indexing carriage 124 of the indexing assembly 120. The indexing carriage 124 provides a platform to which the indexing stop 108 is co-movably coupled. Accordingly, the indexing carriage 124 is translationally movable within the interior cavity 130 of the housing 122 to translationally move the indexing stop 108 within the interior cavity 130 of the housing 122. The indexing carriage 124 also facilitates the incorporation of a seal 132 into the indexing assembly 120 to help form a fluidic seal between the indexing stop 108 and the housing 122. The seal 132 extends around an entire outer periphery of the indexing carriage 124 and sealingly engages an entire inner periphery of the housing 122 that defines the interior cavity 130. The seal 132 deforms against, or otherwise engages, the outer periphery of the indexing carriage 124 and the inner periphery of the housing 122 to form the fluidic seal. Moreover, the fluidic seal is maintained as the indexing carriage 124 translationally moves within the interior cavity 130. In one example, the outer periphery of the indexing carriage 124 includes an annular groove that receives and retains the seal 132.

The housing 122, in some examples, includes a first half 134 and a second half 136 interconnected to the first half 134. The first half 134 and the second half 136 allow the indexing carriage 124 (including the indexing stop 108) and the seal 132 to be located and retained within the interior cavity 130. The first half 134 and the second half 136 of the housing 122 are interconnected with a c-clip 138 in one example. According to another example, the first half 134 and the second half 136 of the housing 122 are interconnected by other means, such as threadable engagement, bonding, welding, and the like. Because the indexing stop 108, indexing carriage 124, and the seal 132 are retained within the interior cavity 130 of the housing 122, the indexing carriage 124 is a modular, self-contained, unit. As such, the indexing assembly 120 can be easily and simply secured (e.g., non-movably fixed) to the bore 150 in the fixture plate 104 in a fully-assembled condition. In one example, the indexing assembly 120 is press-fit into the bore 150. According to another example, the indexing assembly 120 is threadably engaged with the bore 150. In other examples, the indexing assembly 120 is fixed to the bore 150 in other ways, such as welding, bonding, and the like.

Referring to FIG. 5, the system 100 is assembled by locating the fixture plate assembly 101 onto the base 102. Accordingly, other than frictional engagement and subsequent suction force, no coupling means are used to couple the fixture plate assembly 101 onto the base 102. In words, prior to applying the suction force, the fixture plate assembly 101 is free floating on the base 102. Before or after the fixture plate assembly 101 is located on the base 102, the workpiece 106 is located on the fixture plate assembly 101. The fixture plate 104 of the fixture plate assembly 101 includes a support surface 105 on which the workpiece 106 is supported. Other than frictional engagement and subsequent suction force, no coupling means are used to couple the workpiece 106 onto the support surface 105 of the fixture plate 104. In words, prior to applying the suction force, the workpiece 106 is free floating on the support surface 105.

Referring to FIG. 6, after the system 100 is assembled and before the suction force is applied, the indexing stop 108 protrudes from the support surface 105 a height H. The height H is more than zero. Because the indexing stop 108 protrudes from the support surface 105, the workpiece 106 supported on the support surface 105 can be located to engage the indexing stop 108 and other indexing stops 108, as the case may be, to index the workpiece 106 on the support surface 105. At any given time, the workpiece 106 has a thickness T equal to a distance from the support surface 105 to an uppermost surface of the workpiece 106. Although the height H of the indexing stop 108 is shown greater than the thickness T of the workpiece 106, such a relationship is not necessary to index the workpiece 106, as long as the height H is more than zero and high enough to stop slidable movement of the workpiece 106 along the support surface 105.

Referring to FIG. 7, after the workpiece 106 is properly indexed against the indexing stop 108, the vacuum source 110 is selectively operated (e.g., a valve is opened) to create a pressure differential within the conduits of the system 100 that causes a suction force to be applied to the indexing stop 108, which retracts the indexing stop 108. As indicated by shading in FIG. 7, pressure within the conduits of the system 100 is reduced, to vacuum or partial-vacuum conditions, by operation of the vacuum source 110. Lower pressure within the second fluid conduit 114 applies a suction force to the fixture plate 104, which urges the fixture plate 104 against the base 102. Similarly, lower pressure within the third fluid conduit 115 of the base 102 and the fluid conduit 116 of the fixture plate 104, which are aligned and thus fluidly coupled, applies a suction force to the workpiece 106, which urges the workpiece 106 against the support surface 105 of the fixture plate 104. Additionally, lower pressure within the fourth fluid conduit 118 of the base 102, results in a lower pressure within the fluid pocket 152, defined by the bore 150, of the fixture plate 104 and a lower pressure within the interior cavity 130 of the housing 122 of the indexing assembly 120 (by virtue of the through-ports 140 formed in the housing 122), which applies a suction force to the indexing carriage 124 and the indexing stop 108. In this manner, fourth fluid conduit 118 and source fluid conduit 112 facilitate fluid coupling between the bore 150 and the fluid conduit 116 and fluid coupling to the vacuum source 110.

In some examples, the housing 122 includes at least one through-port 140. The through-port 140 includes a first end that is fluidly open to the interior cavity 130 of the housing 122 and a second end, opposite the first end, that is fluidly open to the vacuum source 110. Accordingly, the through-port 140 helps to transmit pressure changes, generated by the vacuum source 110, to the interior cavity 130.

The vacuum source 110 is selected such that the suction force applied to the indexing carriage 124 and the indexing stop 108 is greater than the bias of the spring 128. Accordingly, as the suction force is applied, the indexing carriage 124 overcomes the bias of the spring 128 and the indexing carriage 124 and the indexing stop 108 translationally move toward the base 102, which retracts the indexing stop 108 into the retracted position, as shown in FIG. 7. In the retracted position, an outermost surface of the indexing stop 108 is recessed a depth D relative to the support surface 105 of the fixture plate 104. The depth D is greater than zero and less than 0.01 inches, such as 0.005 inches, in certain examples. In some examples, the depth D is zero, such that the outermost surface of the indexing stop 108 is flush with the support surface 105. However, in certain examples, in the retracted position, the outermost surface of the indexing stop 108 protrudes from the support surface 105 a height H that is less than a finished thickness of the workpiece 106.

Although not shown, in some examples, a first gasket is located between the fixture plate 104 and the base 102 and a second gasket is located between the workpiece 106 and the support surface 105 of the fixture plate 104 before the suction force is applied to the fixture plate 104 and the workpiece 106. The gaskets help to seal the fixture plate 104 against the base 102 and seal the workpiece 106 against the support surface 105, respectively, to help prevent leaks and ensure adequate suction force is applied.

In some examples, the second fluid conduit 114, the third fluid conduit 115, and the fourth fluid conduit 118 are integratably formed in the base 102. As used herein, in this instance, integratably formed means formed as a one-piece, monolithic, continuous construction with the base 102. Moreover, at least a portion of the second fluid conduit 114, the third fluid conduit 115, and the fourth fluid conduit 118 has an open upper side. In the same examples, the fluid conduit 116 is integratably formed in the fixture plate 104. As used herein, in this instance, integratably formed means formed as a one-piece, monolithic, continuous construction with the fixture plate 104. The fluid conduit 116 has an open lower side and an open upper side. The lower side of the fluid conduit 116 is aligned with and fluidly open to an open upper side of the third fluid conduit 115 when the fixture plate 104 is supposed on the base 102. Similarly, the open upper side of the fourth fluid conduit 118 is aligned with and fluidly open to the fluid pocket 152 of the fixture plate 104. At least a portion of the source fluid conduit 112 is integratably formed in the base 102 in some examples. Portions of the source fluid conduit 112 external to the base 102 may be embodied by a hose that extends between the base 102 and the vacuum source 110 and is fluidly coupled to the base 102 by a fluid valve or fitting. Integratably forming conduits into the base 102 and fixture plate 104 helps to simplify and make more predictable the assembly process.

According to certain examples, the system 100 includes a plurality of fixture plates 104 each with a different configuration (e.g., pattern) of indexing stops 108. The fixture plates 104 can be used interchangeably depending on the workpiece 106 being fabricated.

Figure 8:
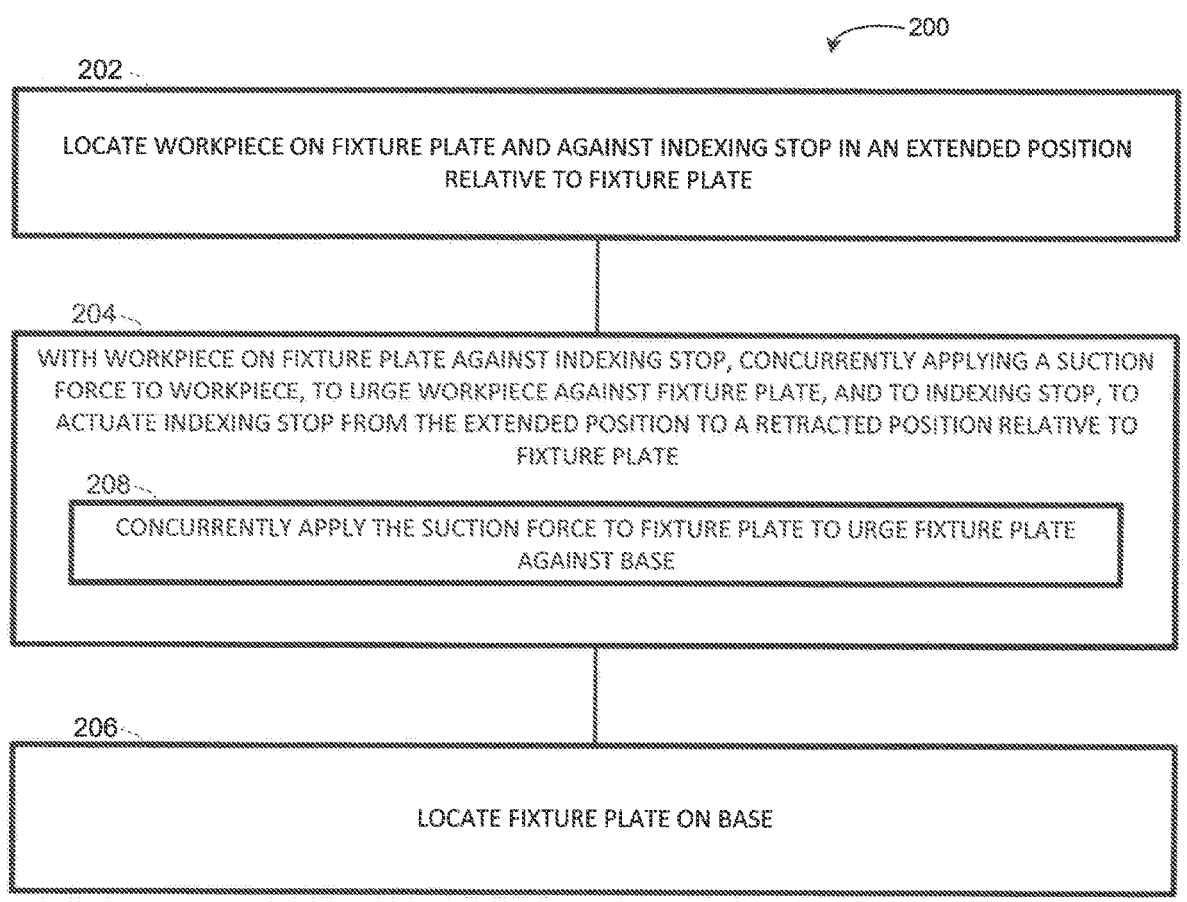
FIG. 8 is a schematic flow chart of a method of indexing a workpiece, according to one or more examples of the present disclosure.

Referring to FIG. 8, according to some examples, a method 200 of indexing a workpiece 106, using the system 100 or the fixture plate assembly 101, is disclosed. Method 200 includes (block 202) locating the workpiece 106 on the fixture plate 104 and against the indexing stop 108 when the indexing stop 108 is in the extended position relative to the fixture plate 104. The indexing stop 108 is coupled to the fixture plate 104. The method 200 also includes (block 204), with the workpiece 106 on the fixture plate 104 against the indexing stop 108, concurrently applying a suction force to the workpiece 106, to urge the workpiece 106 against the fixture plate 104, and to the indexing stop 108, to actuate the indexing stop 108 from the extended position to the retracted position relative to the fixture plate 104. Concurrently urging the workpiece 106 against the fixture plate 104 and the indexing stop 108 into the retracted position, with a suction force, promotes ease in fabricating (e.g., machining) the workpiece 106, particularly if the workpiece 106 is thin, by simultaneously securing the workpiece 106 to the fixture plate 104 and moving the indexing stop 108 out of the way of any fabrication tools. In certain examples, in the retracted position, the indexing stop 108 is flush with or recessed relative to the support surface 105 of the fixture plate 104. The suction force is applied via selective operation of the vacuum source 110 in some examples.

According to some examples, the method 200 additionally includes (block 206) locating the fixture plate 104 on the base 102. According to the method 200, (block 204) concurrently applying the suction force to the workpiece 106 and to the indexing stop 108 further comprises (block 208) concurrently applying the suction force to the fixture plate 104 to urge the fixture plate 104 against the base 102. Concurrently urging the fixture plate 104 against the base 102, along with urging the workpiece 106 against the fixture plate 104 and urging the indexing stop 108 into the retracted position, promotes ease in fabricating the workpiece 106 and facilities fabrication of variously sized or shaped workpieces by enabling quick and efficient interchangeability of differently configured fixture plate assemblies (101) on the base 102.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A system for indexing a workpiece, the system comprising:
a vacuum source;
a fixture plate, fluidly coupled with the vacuum source; and
an indexing stop, coupled to the fixture plate and fluidly coupled with the vacuum source, wherein the indexing stop is actuatable between an extended position and a retracted position relative to the fixture plate;
wherein the vacuum source is selectively operable to concurrently apply a suction force:
to a workpiece supported on the fixture plate to urge the workpiece against the fixture plate; and
to the indexing stop to actuate the indexing stop from the extended position to the retracted position.

2. The system according to claim 1, wherein:
the fixture plate comprises a bore;
the indexing stop is translationally movable within the bore between the extended position and the retracted position; and
the suction force is applied to the indexing stop via the bore.

3. The system according to claim 2, further comprising an indexing assembly, positioned at least partially within the bore of the fixture plate, wherein the indexing assembly comprises:
the indexing stop;
a housing that defines an interior cavity within which the indexing stop is translationally movable; and
a spring, within the interior cavity and biasing the indexing stop into the extended position.

4. The system according to claim 3, wherein the housing comprises a through-port having a first end fluidly open to the interior cavity and a second end, opposite the first end, fluidly open to the vacuum source.

5. The system according to claim 4, wherein:
the indexing assembly further comprises a seal interposed between the indexing stop and the housing; and
the seal forms a fluidic seal between the indexing stop and the housing as the indexing stop translationally moves within the interior cavity of the housing.

6. The system according to claim 2, wherein:
the fixture plate comprises a fluid conduit;
the suction force is applied to the workpiece via the fluid conduit; and
the bore and the fluid conduit are fluidly coupled together and to the vacuum source.

7. The system according to claim 1, wherein:
the fixture plate comprises a support surface;
the workpiece is urged against the support surface when the vacuum source concurrently applies the suction force to the workpiece;
in the extended position, the indexing stop protrudes from the support surface; and
in the retracted position, the indexing stop does not protrude from the support surface.

8. The system according to claim 7, wherein, in the retracted position, the indexing stop is flush with the support surface.

9. The system according to claim 7, wherein, in the retracted position, the indexing stop is recessed relative to the support surface.

10. The system according to claim 1, further comprising a base fluidly coupled with the vacuum source and supporting the fixture plate, wherein the vacuum source is further selectively operable to concurrently apply the suction force to the fixture plate to urge the fixture plate against the base.

11. The system according to claim 10, wherein:
the fixture plate comprises a fluid conduit integratably formed in the fixture plate;
the base comprises a second fluid conduit, a third fluid conduit, and a fourth fluid conduit integratably formed in the base;
the fluid conduit of the fixture plate is fluidly coupled with the third fluid conduit of the base and the suction force is concurrently applied to the workpiece via the fluid conduit of the fixture plate and the third fluid conduit of the base;
the suction force is concurrently applied to the fixture plate via the second fluid conduit;
the suction force is concurrently applied to the indexing stop via the fourth fluid conduit of the base; and
the system further comprises a source fluid conduit fluidly interconnecting the second fluid conduit, the third fluid conduit, and the fourth fluid conduit of the base with the vacuum source.

12. The system according to claim 1, further comprising a plurality of indexing stops spaced apart from each other about the fixture plate according to a predetermined workpiece indexing pattern, wherein the vacuum source is selectively operable to concurrently apply the suction force to the plurality of indexing stops to concurrently actuate the plurality of indexing stops from the extended position to the retracted position.

13. A fixture plate assembly for indexing a workpiece, the fixture plate assembly comprising:
a fixture plate, fluidly coupleable with a vacuum source; and
an indexing stop, coupled to the fixture plate and fluidly coupleable with the vacuum source, wherein the indexing stop is actuatable between an extended position and a retracted position relative to the fixture plate;
wherein, when fluidly coupled with the vacuum source, selective operation of the vacuum source concurrently applies a suction force:
to a workpiece supported on the fixture plate to urge the workpiece against the fixture plate; and
to the indexing stop to actuate the indexing stop from the extended position to the retracted position.

14. The fixture plate assembly according to claim 13, wherein:
the fixture plate comprises a bore;
the fixture plate assembly further comprises an indexing assembly, positioned at least partially within the bore of the fixture plate, wherein the indexing assembly comprises:
the indexing stop;
a housing, non-movably fixed relative to the fixture plate and defining an interior cavity within which the indexing stop is translationally movable between the extended position and the retracted position; and
a spring, within the interior cavity and biasing the indexing stop into the extended position; and
the suction force is applied to the indexing stop via the interior cavity of the housing and the bore of the fixture plate.

15. The fixture plate assembly according to claim 13, wherein:
the fixture plate comprises a support surface;

the workpiece, when supported on the support surface, is urged against the support surface when the vacuum source concurrently applies the suction force to the workpiece;

in the extended position, the indexing stop protrudes from the support surface; and in the retracted position, the indexing stop is flush with or recessed relative to the support surface.

16. The fixture plate assembly according to claim 13, further comprising a plurality of indexing stops spaced apart from each other about the fixture plate according to a predetermined workpiece indexing pattern, wherein when fluidly coupled with the vacuum source, selective operation of the vacuum source concurrently applies the suction force to the plurality of indexing stops to concurrently actuate the plurality of indexing stops from the extended position to the retracted position.

17. A method of indexing a workpiece, the method comprising:

locating a workpiece on a fixture plate and against an indexing stop coupled to the fixture plate and in an extended position relative to the fixture plate; and with the workpiece on the fixture plate against the indexing stop, concurrently applying a suction force to the workpiece, to urge the workpiece against the fixture plate, and to the indexing stop, to actuate the indexing stop from the extended position to a retracted position relative to the fixture plate.

18. The method according to claim 17, wherein, in the retracted position, the indexing stop is flush with or recessed relative to a support surface of the fixture plate on which the workpiece is supported when the workpiece is located on the fixture plate.

19. The method according to claim 17, further comprising locating the fixture plate on a base, wherein the step of concurrently applying the suction force to the workpiece and to the indexing stop further comprises concurrently applying the suction force to the fixture plate to urge the fixture plate against the base.

20. The method according to claim 17, wherein the suction force is applied via selective operation of a vacuum source.

* * * * *